United States Patent [19]

Walker

[11] Patent Number: 4,988,169

[45] Date of Patent: Jan. 29, 1991

[54] OPTICAL SIGNAL CONTROL METHOD AND APPARATUS

[75] Inventor: Nigel G. Walker, Ipswich, England

[73] Assignee: British Telecommunications public limited company, London, England

[21] Appl. No.: 201,122

[22] PCT Filed: Sep. 18, 1987

[86] PCT No.: PCT/GB87/00653

§ 371 Date: May 20, 1988

§ 102(e) Date: May 20, 1988

[87] PCT Pub. No.: WO88/02127

PCT Pub. Date: Mar. 24, 1988

[30] Foreign Application Priority Data

Sep. 22, 1986 [GB] United Kingdom ............... 8622768
Mar. 11, 1987 [GB] United Kingdom ............... 8705746
Mar. 27, 1987 [GB] United Kingdom ............... 8707441

[51] Int. Cl.$^5$ ............................................. G02F 1/01
[52] U.S. Cl. ..................................... 350/371; 350/405
[58] Field of Search ..................... 350/371, 405, 370

[56] References Cited

U.S. PATENT DOCUMENTS 4,729,622  3/1988  Pavlath ........................... 350/371 X

FOREIGN PATENT DOCUMENTS 3150697  7/1983  Fed. Rep. of Germany .

OTHER PUBLICATIONS

Electronics Letters, vol. 22, No. 2, Jan. 16, 1986 (New York, U.S.), L. J. Rysdale: "Method of Overcoming Finite-Range Limitation of Certain State of Polarisation Control Devices in Automatic Polarisation Control Schemes", pp. 100–102.

Electronics and Communications in Japan, vol. 68, No. 6, Part 2: Electronics, Nov./Dec. 1985, Scripta Technica, Inc. (Silver Spring, Md., U.S.), Y. Kido: "Light Polarization Control Due to Electrooptic Effect", pp. 38–47.

Applied Physics Letters, vol. 35, No. 11, Dec. 79, American Institute of Physics, New York, U.S.), R. Ulrich: "Polarization Stabilization on Single-Mode Fiber", pp. 840–842.

*Primary Examiner*—Bruce Y. Arnold
*Assistant Examiner*—David R. Parsons
*Attorney, Agent, or Firm*—Nixon & Vanderhye

[57] ABSTRACT

A method and apparatus for controlling the polarization of an optical signal has many applications, including in coherent systems, e.g. heterodyne detectors. Four birefringent elements (19, 21, 23, 25) in series are arranged to rotate the state of polarization (SOP) alternately about orthogonal axes on a Poincare sphere. A controller enables time varying initial and final polarization states (S, S') to be tracked. It also ensures that the birefringence limits of the elements are never reached by carrying out an adjustment procedure. A reduction by a full revolution ($2\pi$) for one element (e.g. 19) can be achieved by varying the transformations of the other elements by not more than $\pi$.

20 Claims, 7 Drawing Sheets

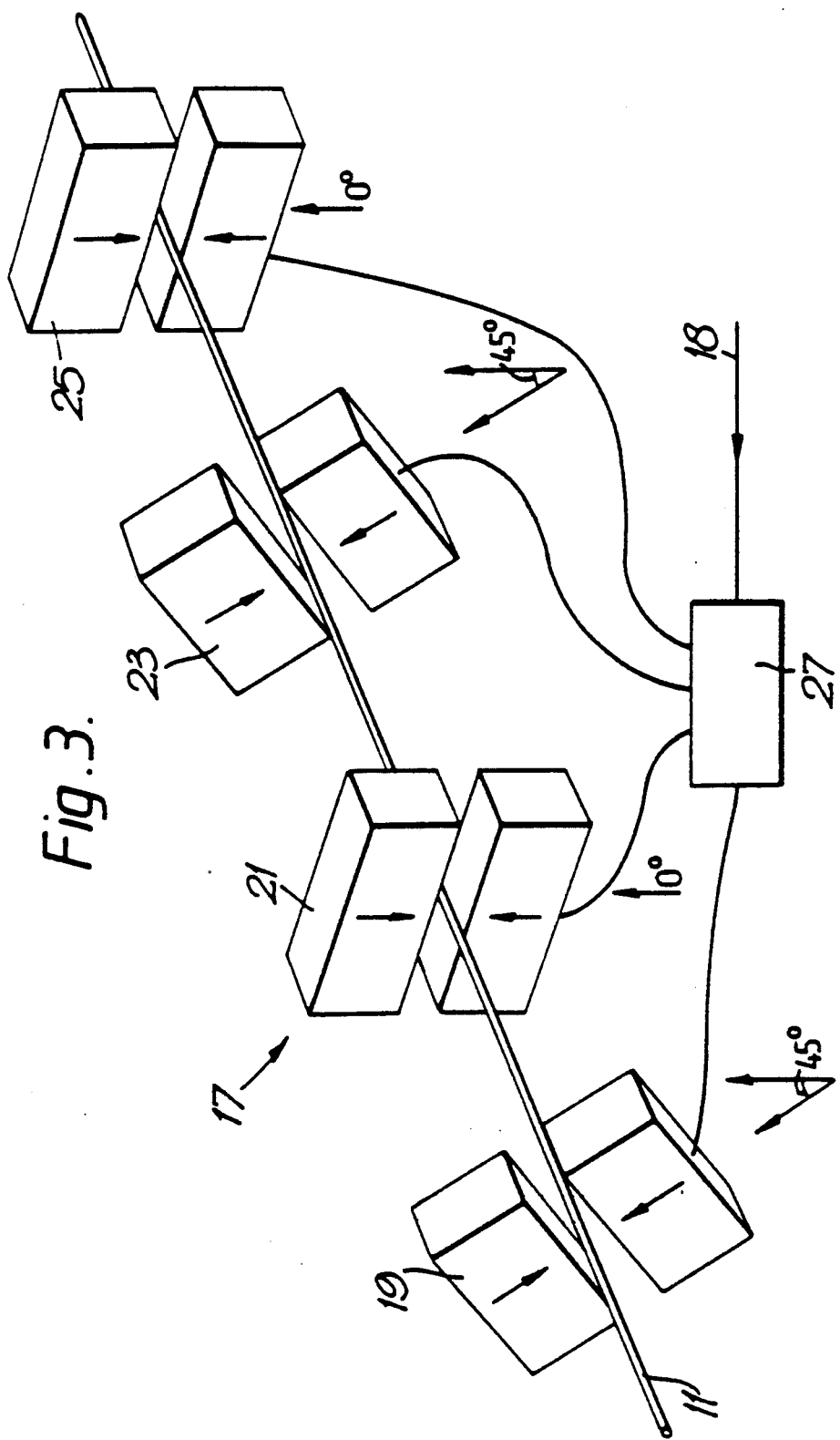

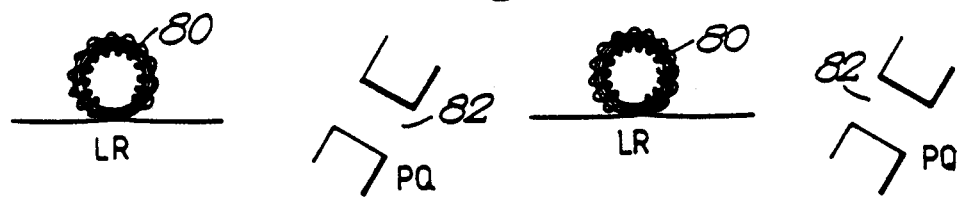
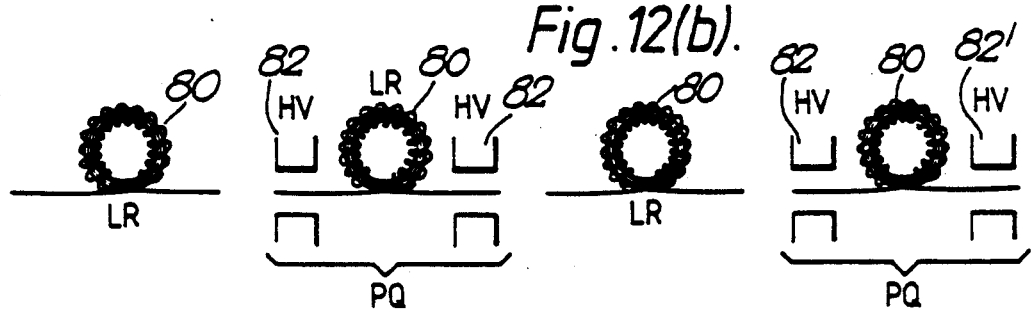
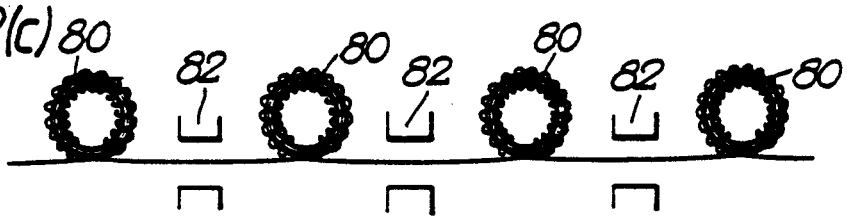
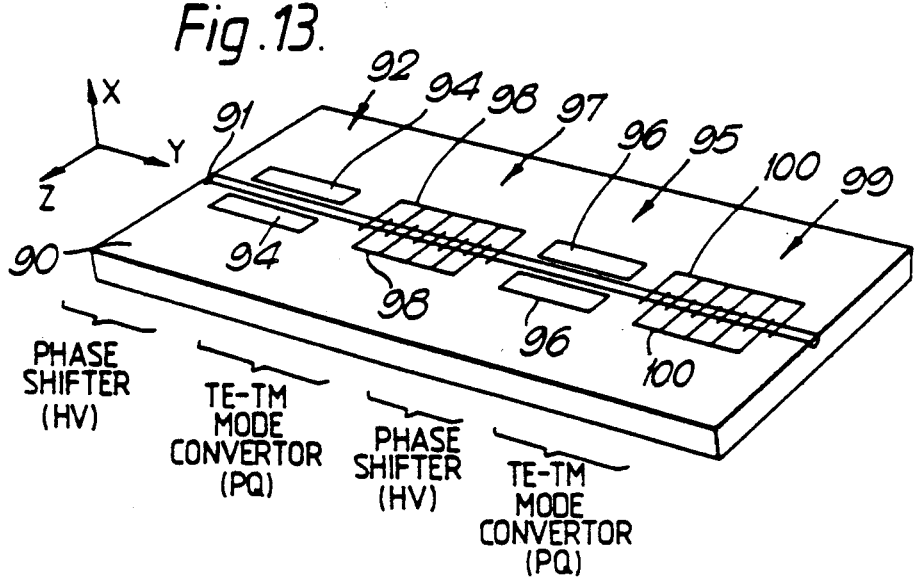

OPTICAL SIGNAL CONTROL METHOD AND APPARATUS

BACKGROUND AND SUMMARY OF THE INVENTION

The present invention relates to an optical signal control method and apparatus. In particular, it relates to automatic control of polarisation of optical signals.

In general, optical waveguides do not preserve the polarisation state of light emerging from a length of waveguide: the polarisation varies with time.

A single mode fibre having circular symmetry about the axis of the core allows propagation of two orthogonally polarised modes. The fibre behaves as a birefringent medium due to differences in propagation speeds of the two modes resulting from anisotropy of the refractive index of the fibre core. A number of birefringence-inducing mechanisms are known. For example, a non-circular core introduces linear birefringence: the smaller transverse dimension of the fibre core becomes the fast axis of birefringence. Changing the electro-optic index, for example by applying an asymmetrical transverse stress, also induces linear birefringence, as does the application of a transverse electric field Linear birefringence may also be controlled by applying a voltage to electro-optic material such as lithium niobate. Alternatively, circular birefringence may be induced by means of a magnetic field along the length of the fibre (Faraday effect).

In many circumstances, it is desirable to be able to control the state of polarisation (SOP) of the modes in a fibre. One example is in coherent detection systems, where the polarisation states of the incoming signal and the local oscillator must be the same. It is therefore important to be able to control the SOP of one of the signals. Ideally, it should be possible to match any polarisation state to any other state, where both the initial and final states may vary.

Polarisation states can be represented on the Poincare sphere. This representation is fully described in published literature, e.g. Rashleigh: "Origins and Control of Polarisation Effects in Single Mode Fibres", J Lightwave Technology Vol. LT 1 No 2 June 1983 p. 312-331. Any general elliptical polarisation state such as shown in FIG. 1, where $\psi = \pm \arctan b/a$, is represented on the sphere by a single point S as shown in FIG. 2.

Horizontal and vertical polarisation states are represented by H and V respectively, and all linear states lie on the great circle HPVQ, where the latitude is zero. P and Q represent polarisation at $\pm \pi/4$ to the L and V states. L represents left hand circular polarisation and R right hand circular polarisation. Any state of polarisation is represented by a unique point on the sphere, where $\psi i$ and $\phi i$ of a particular elliptical polarisation state are represented by co-ordinates $2\psi i$ and $2\phi i$ on the sphere.

Birefringence causes a change in polarisation state from S to S' and thus a rotation about an axis passing through the centre of the sphere, through an angle which depends on the magnitude of the birefringence. Linear birefringence causes rotation about an axis lying in the plane HPVQ of FIG. 2.

Various methods have been proposed for controlling the SOP of a waveform propagating in single mode fibre. In a coherent optical communications system, a slight polarisation mismatch between the incoming signal and local oscillator signal causes a significant fall in received signal. The polarisation states of both signals may vary with time so if only one polarisation state is controlled, the controller must be able to transform any polarisation state S into any derived state S', where S, S' can lie anywhere on the Poincare sphere. Two birefringent elements in series are inadequate to transform S to S' for every S, S', but three elements may be adequate under certain circumstances. In practice a stress inducing birefringent element, for example, cannot apply a greater and greater stress to the fibre, or the fibre will break. It is therefore necessary to be able to reset or adjust birefringent elements, meanwhile maintaining the transformation of the SOP of the signal from the initial to final states, however those states may vary. Methods of resetting have been proposed, involving the introduction of further birefringent elements.

In Electronics Letters, Vol 22 No 2, Jan. 16th 1986, page 100, Rysedale proposes polarisation transformation using four birefringent elements in series. The first, third and fourth elements are linearly birefringent, causing rotation of the SOP on the Poincare sphere about axes x, y and x respectively (x, y orthogonal), and the second element is circularly birefringent, causing rotation about the axis LR.

This arrangement could, if suitably programmed, continuously alter a fixed SOP S to a final varying SOP S'. This is achieved without serious loss of intensity by resetting the birefringence of the third and fourth elements.

In Proceedings of the Sixth European Symposium on Optoelectronics (OPTO 86), Paris, May 12–16 1986, a paper by R. Noe and G. Fischer describes an alternative approach involving five electromagnetic linear birefringent elements ("fibre squeezers") in series. The first, third and fifth squeezers are aligned to induce birefringence having the same fast axis, and interposed second and fourth squeezers are aligned at 45° to the others. Thus, a series of five rotations takes place on the Poincare sphere about the axes QP (three rotations) and HV (two rotations). A similar arrangement involving only four squeezers is described in Electronics Letters, Vol. 22, No. 15, July 17th 1986, p. 772-3. This can transform an initially horizontally polarised signal into any desired state of polarisation. The first two transformations ($d_1$ and $d_2$) are effectively kept in reserve, $d_3$ and $d_4$ achieving the necessary transformations themselves, until a range limit is reached. If $d_3$ reaches a range limit, an exchange is carried out using $d_1$, to bring $d_3$ back to a predetermined point within its range. Similarly, $d_2$ can be used for exchange with $d_4$ when it reaches its range limit.

The present invention can provide practical and robust means for polarisation control or matching. Apparatus according to the invention may comprise three or four variable birefringent means, such as linear birefringent elements, arranged to rotate the state of polarisation sequentially about respective axes on the Poincare sphere, where the axes are preferably substantially orthogonal.

The use of four elements enables a desired transformation between two time varying polarisation states to be maintained (which covers "adhered to" in the case of a varying requirement) without the birefringence of any element falling outside its working limits. At selected or appropriate times, one element is subjected to an adjustment procedure to vary its birefringence. This enables elements to be 'unwound'—i.e. their birefringences increased or decreased - by any desired amounts to keep all elements within their limits. The adjustments may be frequent small ones, or large ones (e.g. $2\pi$ or more on the Poincare sphere) if elements are allowed to approach their working limits. The adjustment procedure may, for example, be carried out sequentially on each element in turn, or by selecting the element nearest the limits; there are many other possibilities. With four elements, it will generally be possible to unwind the outer two elements, if required, to any desired extent. Depending on the algorithm selected for control, it may never be necessary to unwind, or select for adjustment, the inner two elements. If the circumstances are such that the inner elements do require unwinding, they can be, although it may be necessary to impose a delay until the two varying polarisation states (initial and final states) are appropriately located on the Poincare sphere for unwinding to continue.

Similarly, with three elements, it is possible to transform between two polarisation states where one of the states may vary with time. In this case, it may only be necessary to unwind the element remote from the fixed state.

Arrangements according to the invention can be extremely flexible, and the controller itself can operate in a more straightforward manner than in known prior art proposals.

The various aspects of the present invention are set forth in the appended claims, and embodiments of the invention are described below.

These provide particularly simple and convenient ways of controlling polarisation. The number of birefringent elements required is fewer, in some cases, than in prior art systems, and the procedure is generally simpler and cheaper to operate. It can also be more robust and flexible.

Throughout the specification and claims, it is to be appreciated that where reference is made to a variable birefringent element carrying out a rotation of a given angle, the given angle is intended to refer to the net rotation (unless the context indicates otherwise). Such a net rotation could for example be achieved by rotating by the given angle plus or minus any multiple of $2\pi$. Also, references are made throughout to orthogonal axes of rotation (a, b, x, y etc). In practice, true orthogonality is hard to achieve and variations can be accommodated without significant loss of matching/signal.

BRIEF DESCRIPTION OF THE DRAWING FIGURES

Embodiments of the invention will now be described by way of example with reference to the accompanying drawings in which:

FIG. 3 is a schematic diagram of a polarisation controller;

Figure 12A:
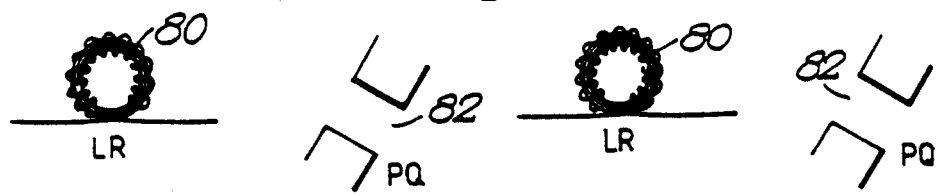
Figure 12B:
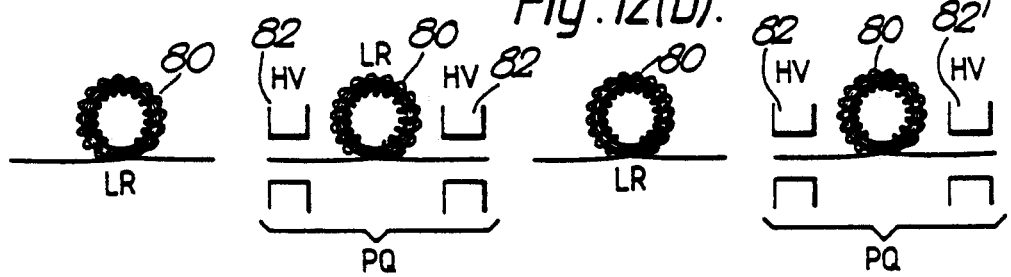
Figure 12C:
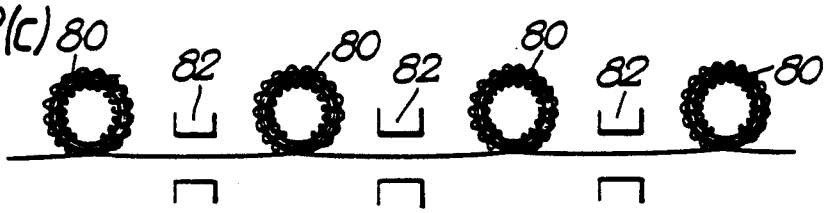
Figure 13:
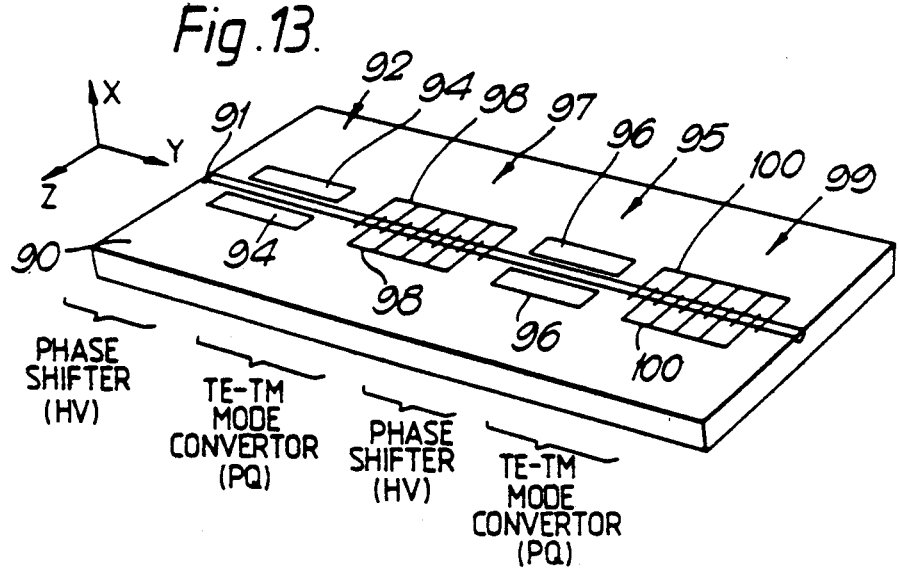

FIGS. 12(a) to (c) show various arrangements of linear and circular birefringent elements which may be used in a polarisation controller embodying the invention; and FIG. 13 is a schematic representation of a birefringent element which may be provided along a waveguide on a solid state device, and which may be used in apparatus embodying the invention.

DETAILED DESCRIPTION OF THE DRAWING FIGURES

FIG. 3 shows, schematically, elements of a polarisation controller 17. The controller comprises four stress-inducing elements 19, 21, 23, 25 arranged in series and connected to a microprocessor controller 27. The stress-inducing elements may conveniently comprise pressure plates as illustrated, or electromechanical or piezo-electric birefringent elements. All four elements are identical and are adapted to apply a variable stress to a fibre 11, thereby causing linear birefringence.

A birefringent element may have a full range of around $8\pi$—i.e. when no stress is applied, the rotation of the SOP is zero, whilst with maximum permissible stress, the rotation of the SOP is $8\pi$ (four revolutions). Above this maximum, there is a risk of damage to the fibre. The zero and maximum stress points set absolute limits on possible transformations, and it is important that these absolute limits are never exceeded. In practice, a centre of range stress is selected as a nominal working zero. In this example the working zero is $4\pi$ from the actual zero and variations within set limits about this working zero are permitted. In this example, the limit chosen for each element is $\pm(2\pi+\delta)$ from the working zero, where $\delta<\pi/4$. Once a $2\pi+\delta$ limit is reached, an unwinding procedure is commenced in order to reduce the rotation from the nominal zero in either direction by at least $2\pi$ (a full revolution). This ensures that the absolute limits ($\pm4\pi$ from working zero) are never reached. In the description and claims which follow, references to varying angles of rotation, magnitudes of transformations, adjustments of birefringence and so on are references to those things relative to a selected working zero position (unless the context requires otherwise). As mentioned above, this may conveniently be at or close to the centre of the full range for the birefringent element concerned.

Figure 4:
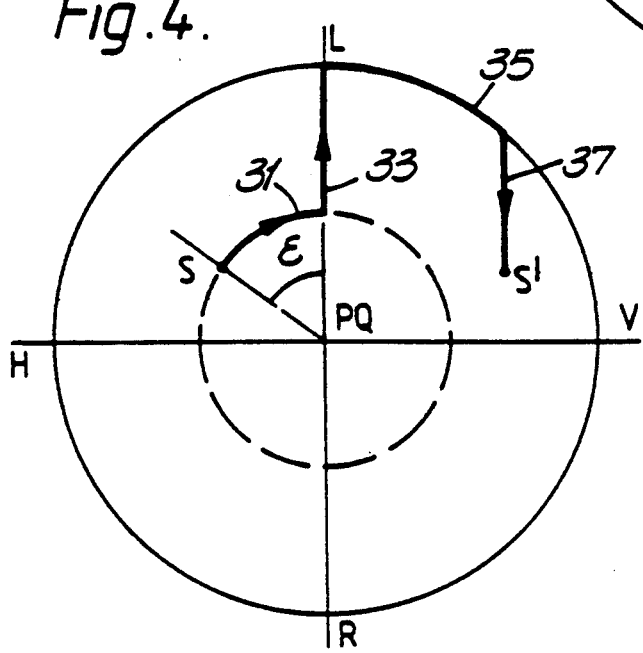
FIGS. 4 and 5 show various transformations on the Poincare sphere using the controller of FIG. 3.

The first and third elements 19 and 23 are aligned to impose parallel forces, inducing respective rotations about the axis PQ of the Poincare sphere of FIG. 4. Elements 21 and 25 are also aligned, and impose respective forces at an angle of $\pi/4$ to the forces from the elements 19 and 23: these rotations of the SOP therefore take place about axis HV of the Poincare sphere.

Figure 1:
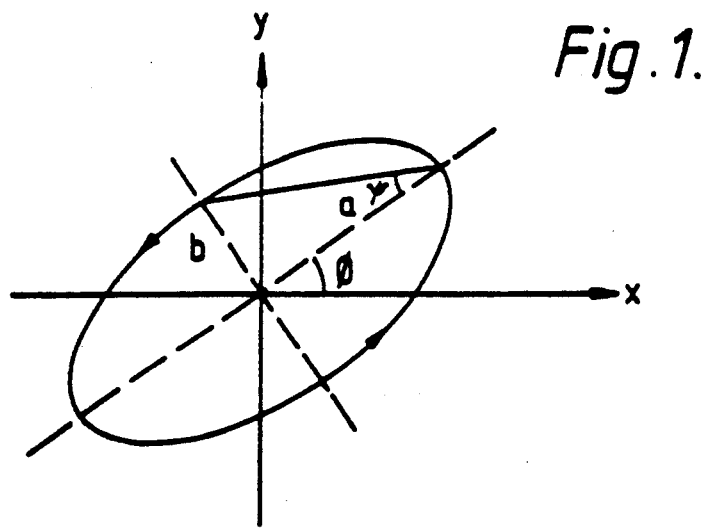
FIG. 1 is a representation of an arbitrary elliptical polarisation state.
Figure 2:
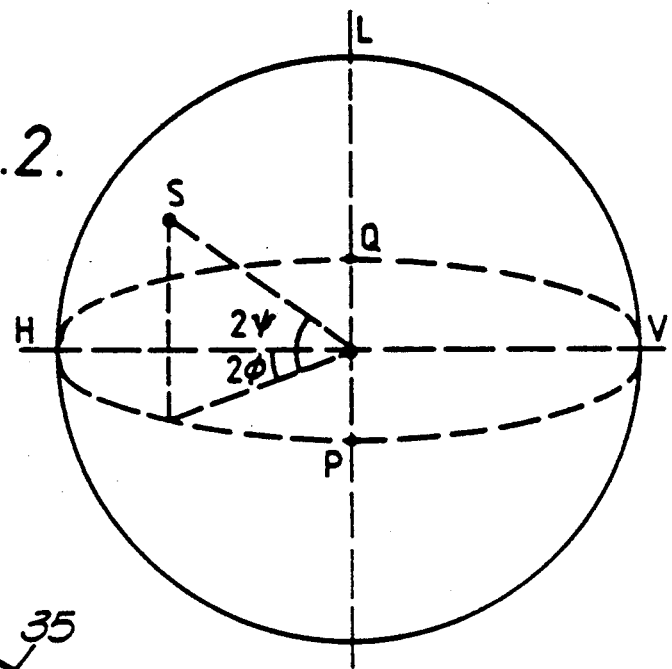
FIG. 2 is a representation of a Poincare sphere showing the state of FIG. 1 at a point S on the sphere.

A set of transformations 31, 33, 35 and 37 induced by the four elements 19, 21, 23 and 25 is shown in FIG. 4, which is a side view of the Poincare sphere of FIG. 2.

This is one set amongst many possible sets for transforming SOP S to S'.

In practice the microprocessor controller 27 is programmed to achieve the following. The element 19 causes rotation of the SOP through an angle $\epsilon$ about axis PQ on the sphere until it reaches the great circle containing the states of circular polarisation LPRQ. The second element 21 then causes rotation 33 on that great circle (about axis HV) until the point L is reached. There is then a further rotation 35, induced by element 23 about axis PQ on the great circle through LVRH to a point from which a final rotation 37 about axis HV (caused by element 25) alters the SOP to that of S', the desired final state.

As stated above, S and S' may lie anywhere on the Poincare sphere, and they may both vary with time. In most coherent detection systems, the variation in the SOP is quite slow - a substantial change may take several minutes. The detector measures the intensity of the output signal and sends an intensity related signal to a controller (as described below with reference to FIG. 10). If the intensity falls, indicating poor polarisation matching and therefore poor tracking of variations in S or S', there is an iterative procedure varying the stresses on the birefringent elements 19, 21 and 23, 25 to relocate the set of transformations described above for a new S or S' (or both). The algorithm in this example is such that the final states of the transformations 33, 35 lie on the great circles shown, unless certain limits are reached (as described below).

Many different iterative procedures are possible to achieve good tracking of S, S'. Good tracking is achieved by maximising the output signal at the detector. One possibility involves rapidly increasing and decreasing ("dithering") the stresses on elements 21 and 23 at a rate substantially faster than time variations in states S, S'; this correspondingly increases and decreases the angles of rotation of transformations 33 and 35, to vary the output signal. Correct polarisation matching is then achieved using a second order analysis (using the second order derivatives of received intensity with respect to the stresses for each element) to determine the true maximum and distinguish other turning points (minima and saddle points). In order to locate the intersection of transformations 33 and 35 at point L, the stresses applied to elements 19 and 25 are adjusted at a rate slower than the adjustments to elements 21 and 23, but faster than the variations in S and S'. Suitable adjustments are determined from the magnitudes of the second order derivatives from the above analysis, which enable one to identify when transformations 33, 35 lie on great circles The variation in the positions of S and S' with time may cause the stresses on elements 19 and 25 to increase so that their transformations become greater than $2\pi$. If it were not possible to "unwind", the maximum limit for birefringent element 19 could be reached, and the initial SOP S could not be tracked further (following the above rules for transformations 33 and 35).

Figure 5:
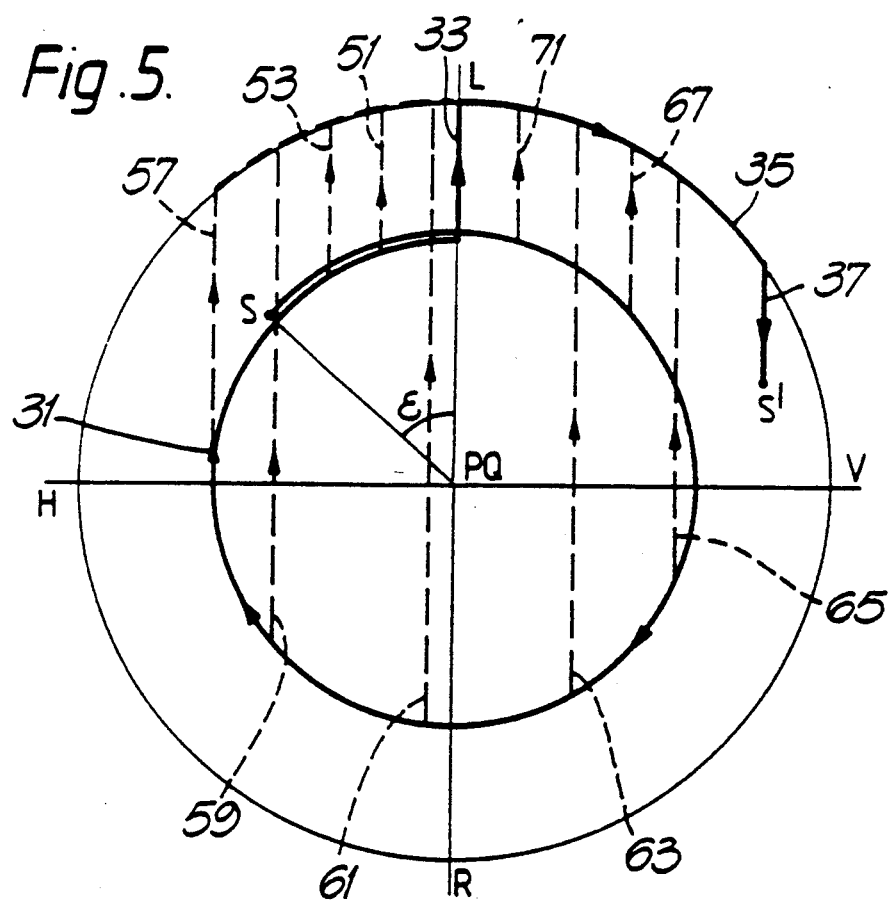

Once one of these elements, 19 say, reaches an imposed upper or lower bound, then an unwinding operation begins. In the example shown in FIG. 5, element 19 has exceeded its upper bound; the stress applied by the other element which rotates the SOP about the same axis, element 23 in this case, is caused to rise and then fall gradually (or vice versa). Meanwhile the stress applied by element 21 correspondingly falls and then rises (or vice versa). The stress applied by element 19 gradually reduces during this procedure, which is illustrated in FIG. 5. Initially, the rotation induced by element 19 is $(2\pi + \epsilon)$. The stresses on elements 19, 21 and 23 are all gradually varied. The rotation caused by element 21 varies smoothly from the initial state 33, incorporating the instantaneous rotations indicated by 51, 53, 57, 59, 61, 63, 65, 67, 71, 33 (in that order); the transformation of element 19 is now reduced to angle $\epsilon$, and rotations 33, 35 and 37 are the same as at the start of the unwinding procedure. As can be seen, transformation 35 goes through a complementary procedure but, unlike transformation 33, it keeps to its great circle. Transformation 37 remains unchanged throughout (unless, of course, state S' varies). It will be appreciated that in the short interval during which the above procedure is carried out, the initial polarisation state S may vary, but that this variation (which is likely to be small) can be tracked and the output intensity maintained at a high level.

A similar procedure is operated if transformation 37 exceeds its prescribed limit.

If both $(2\pi + \delta)$ limits are exceeded simultaneously the limit which is exceeded first is brought down first. In the unlikely event of both limits being reached simultaneously, a selected transformation is brought down first.

It can be seen that, under normal operation, transformations 33 and 35 lie within the range 0 to $\pm \pi$. This is the case even during the unwinding procedure: transformation 31 is unwound by an angle $2\pi$, while transformations 33 and 35 vary by less than $\pi$. Unlike the Noe document, referred to above, there is no direct transfer between pairs of transformations. In the unlikely event that transformation 33 or 35 rises to more than $\pi$, appropriate action can be taken to reduce its angle of rotation and to re-centre the intersection of transformations 33, 35 on L. It will also be observed that by maintaining transformations 33 and 35 on great circles on the Poincare sphere, it will always be possible to unwind either of transformations 31 or 37 by $2\pi$ or more, when necessary.

The method and apparatus described above are one example of one implementation of the present invention.

Figure 7:
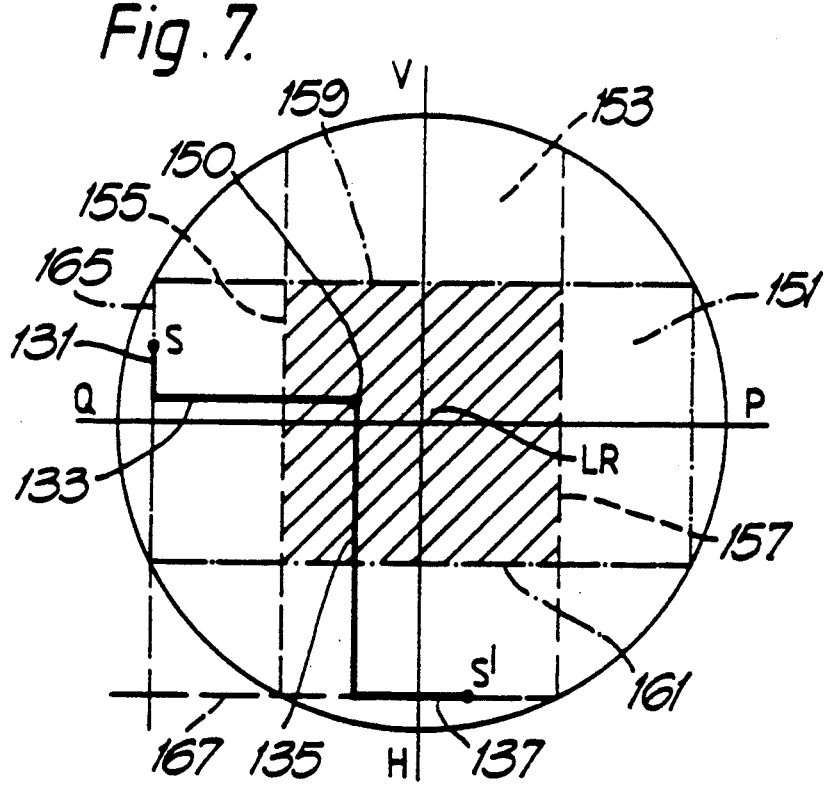
Figure 8:
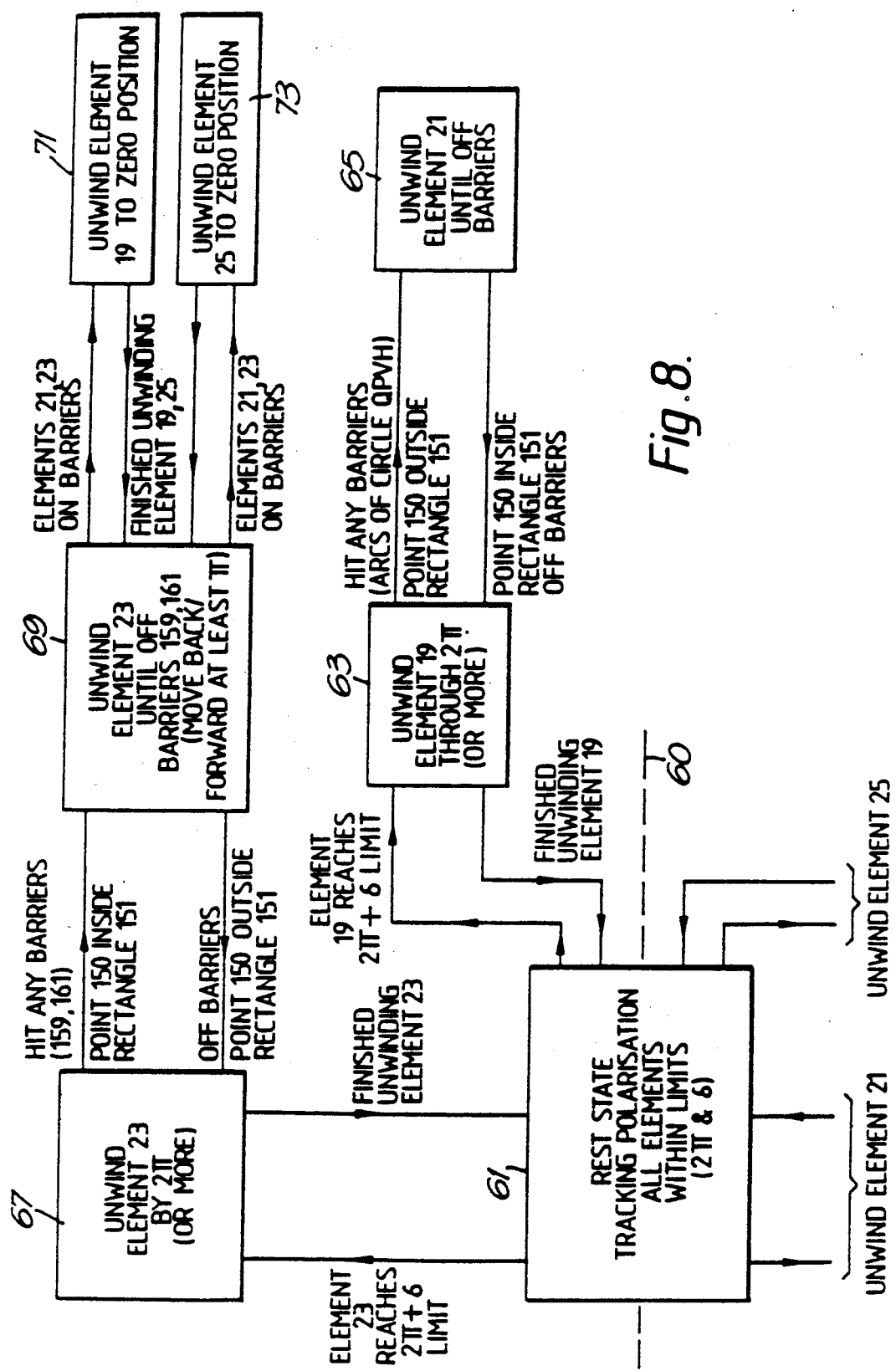
FIG. 8 is a state control diagram for the second embodiment.

An alternative, using the same arrangement of birefringence elements as shown in FIG. 3, will now be described with reference to FIGS. 6 to 8. The difference lies in the control means 27, which does not operate to locate the intersection of the transformations of the central two elements 21, 23 at point L on the Poincare sphere during normal operation, but allows the point of intersection to move freely on the sphere (provided polarisation matching is occurring) until an adjustment procedure is to be carried out. This adjustment procedure can be chosen to maintain the birefringence of the elements close to arbitrarily chosen working centres of their operating ranges.

Figure 6:
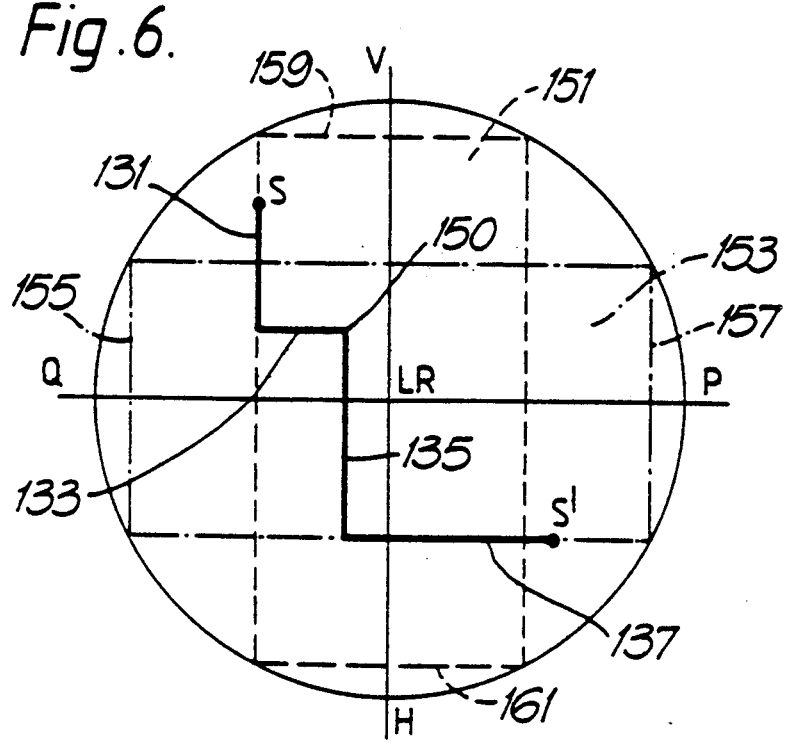
FIGS. 6 and 7 show a Poincare sphere with a set of transformations achieved by a second embodiment of control means.

A plan view of a Poincare sphere is shown in FIG. 6, with four transformations 131, 133, 135, 137 of the four birefringent elements 19, 21, 23 and 25 respectively. As before, S is the initial state of polarisation and S is the final state, and both states may vary with time. The three intermediate polarisation states are all arbitrary, provided transformation S to S' is achieved. The second and third transformations 133 and 135 intersect at a point 150. Two rectangles 151 (bounded by a broken line) and 153 (bounded by a chain dotted line) are indicated on the plan of the sphere. At any instant, the boundary of rectangle 151 is co-incident with the straight line projection of transformation 131, so the size of the rectangle varies if point S moves to the left or right as seen in the Figure. Rectangle 153 is similarly defined by transformation 137, so varies in size as point S' moves up or down as seen in the Figure. Provided point 150 remains within rectangle 151, then the angle of rotation of transformation 131 can be reduced by a complete revolution ($2\pi$), but the angle of transformation 135 cannot be so reduced. (It will be noted that the radius of the rotation of transformation 131 is smaller than that of transformation 135 while point 150 remains within the rectangle 151). Thus, birefringence of the first element 19 can increase or decrease continuously whilst the centre two elements 21, 23 only undergo finite excursions. Elements 19 and 25 can therefore be 'unwound' if they reach range limits. In general, of the two elements that rotate about the same axis, only the one which has the smaller circle of rotation can be unwound completely.

If point 150 lies outside rectangle 151, then the situation is reversed - i.e. transformation 135 can be reduced but transformation 131 cannot be. Point 150 cannot pass to the left of line 155 or the right of line 157 (boundaries of rectangle 153) or there would be loss of polarisation matching; any fall in intensity is detected by a detector 16 (see FIG. 10) and controller 17 takes corrective action.

The strategy is identical for transformations 133 and 137, except that the relevant rectangle is rectangle 153: if point 150 lies within the rectangle, then transformation 137 can be reduced, and if it lies outside, then transformation 133 can be reduced. Polarisation matching is lost if point 150 passes above line 159 or below line 161 of rectangle 151. It will be appreciated that by suitable choice of the intersection point 150, any one of the four birefringent elements can be varied, and its transformation reduced by a full revolution without loss of polarisation matching.

A further set of transformations with different states S, S', is shown in FIG. 7 which again is a plan view of the Poincare sphere. The intersection of lines 165 and 167 (extensions of transformations 131 and 137) lies outside the sphere, and point 150 is constrained to lie within the shaded rectangle bounded by lines 155, 157, 159 and 161 (or polarisation matching is lost). In this situation, it is only possible to reduce the angles of rotation by a full revolution for the first and fourth birefringent elements 19 and 25 (transformations 131 and 137). However, as long as the point of intersection of lines 165 and 167 lies outside the circle VQHP, the central two elements 21, 23 cannot alter their angles of rotation of the SOP on the sphere by more than $\pm \pi$, so there is no risk of a range limit being reached. Therefore, if nominal range limits are set with a margin of at least $\pi$ birefringence from the absolute range limits, it will always be possible to unwind either of the centre two elements before the absolute range limit is encountered.

The controller 17 operates as follows. Polarisation matching is optimised by rapid variations of the transformations in pairs (131 and 133, 133 and 135, 135 and 137) and analysis as described above to identify the maximum. This optimisation continues until a limit (e.g. $2\pi + \delta$) on the magnitude of the angle of a rotation is reached, and then an adjustment procedure is carried out in conjunction with the procedure to maximise output intensity. There is a number of alternative strategies. For example, the birefringences of each of the four elements may be checked periodically, and the adjustment procedure carried out on the element which is closest to a range limit. Another possibility is to unwind, either at selected times or perpetually, each of the four elements cyclically in turn i.e. 19, 21, 23, 25, 19 . . . . In practice, if either of these last two strategies is adopted, it is likely that the unwinding or adjustment necessary will always be small, because checks are carried out frequently. The algorithm therefore operates to keep all elements well within their range limits.

As indicated above, it may not be possible to reduce the angle of rotation for a selected element by the desired amount; this will depend on the relative positions of points S, S' and 150. One example for the transformation shown in FIG. 6 is an attempt to reduce the rotation of element 23 while point 150 lies within the rectangle 151. Point 150 can move vertically towards line 159 or 161, but if line 159 or 161 is reached, the movement of point 150 is halted, as point 150 cannot move beyond these lines without loss of polarisation matching. Lines 159 and 161 therefore act as barriers to the motion of point 150, and while point 150 remains within rectangle 155, anything other than a small reduction of the rotation of transformation 135 is prevented. Controller 27 detects the arrival of point 150 at a barrier and takes appropriate remedial action. For the situation described above, where point 150 has reached line 161, transformation 133 is varied to move point 150 horizontally until it lies on the equator on the border of rectangle 151. Any desired reduction in transformation can then take place.

Now assume it is required to unwind element 19 while point 150 lies outside rectangle 151. Point 150 will again follow a vertical path, until it reaches any of the four arc elements between the apexes of rectangles 151, 153. At this stage, no further unwinding is possible without polarisation mismatch, so these arc elements act as barriers to point 150. The point 150 is moved away from the barriers by adjusting element 21. Note that in the situation of FIG. 7 (intersection of lines 165 and 167 outside the sphere), the arc elements are never encountered and it is always possible to unwind element 19.

Similar strategies apply to adjustment procedures for other elements. The strategies for the pair of elements 19 and 23 are summarised in the diagram of FIG. 8; the strategies for elements 21 and 25 are not shown as the complete diagram is symmetrical about centre-line 60. Polarisation matching is maintained throughout.

Normally, the control algorithm is in state 61, where all elements are within their assigned limits. If element 19 approaches a limit, then the algorithm moves to state 63 and an adjustment procedure is performed on element 19, as described above. If point 150 is outside rectangle 151 then the algorithm moves to state 65 and adjusts element 21 until point 150 is inside the rectangle. There is then a return to state 63 to continue adjusting element 19. When element 19 has been unwound by at least one revolution, control returns to the rest state, 61.

The procedure for adjusting element 23 is similar, although the possibility that element 23 cannot be unwound beyond a certain point must be covered. If element 23 reaches its limit, then the algorithm moves to state 67 and element 23 is unwound. If point 150 lies inside rectangle 151, then state 69 is entered and element 21 is adjusted until point 150 lies outside the rectangle. If it is not possible to achieve this (i.e. if S and S' are in the situation of FIG. 9, where lines 165 and 167 intersect outside the sphere), then control passes to states 71, 73 to adjust elements 19 and 25. When S, S' have moved so that adjustment of element 23 can continue, state 69 is reverted to; on completion of unwinding, there is a return to the rest state 61.

The above examples describe an adjustment procedure when there are four birefringent elements adapted to transform any initial polarisation state S into any other state of polarisation S', where both S and S' may vary with time. Time variations can always be tracked by the controller adjusting birefringences accordingly, so the output intensity remains at a high level (i.e. the desired polarisation transformation is always achieved—in the above example, this is the matching of the polarisation state of a time varying optical input signal with that of a local oscillator signal which also varies).

If only one of the states of polarisation is time variant, then three instead of four birefringent elements are adequate. A polarisation controller having three elements can transform between two states of polarisation S, S' where only one of these is time variant, tracking the varying signal to maintain output intensity. One such set of transformations is shown in FIG. 9.

Figure 9:
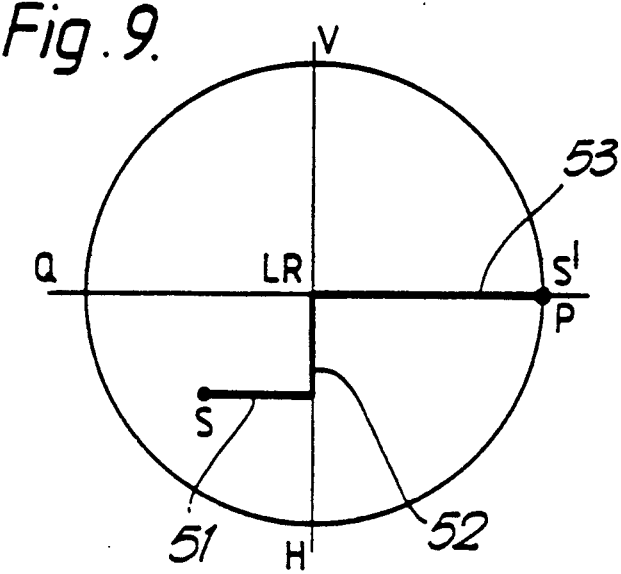
FIG. 9 shows a set of transformations on the Poincare sphere using another embodiment of control means.

Referring to FIG. 9, S is an initial SOP, which varies with time. S' is a required final SOP, which is fixed. First, second and third birefringent elements effect transformations 51, 52, 53 about axes HV, QP and HV respectively. Transformation 53 takes place along a great circle; transformation 52 also lies on a great circle, except during an adjustment procedure as described below. The rotations (52 and 53) of the second and third elements will, during normal operation, lie within the range 0 to $\pm\pi/2$. As S varies, however, the rotation (51) of the first element could increase or decrease and exceed the upper or lower limit. Thus, as described above with reference to FIG. 5, a maximum permitted rotation of $(2\pi+\delta)$ from the centre, zero point for the element is set, and when this is exceeded, an adjustment procedure takes place in which the rotation 51 is reduced by varying both 52 and 53 within the range 0 and $\pm\pi$. The algorithm is similar to that described for either of the above examples.

In normal operation, transformations 52 and 53 will remain within working limits and it will not be necessary to unwind either of them. Practical implementation will, however, be more satisfactory if there is provision for unwinding of all elements. This can be achieved whenever the time varying polarisation lies on the great circle LQRP. Transformation 53 can then be unwound using a similar procedure to that described in the above examples, whereas transformation 52 can be unwound if it is first positioned on Q or P, the eigenstates of the second element.

Even if one of the initial or final states of polarisation is fixed, there are advantages in using four birefringent elements. The system can be made more robust: for example, action can be taken to reduce transformations whenever desirable.

The control method and apparatus of the present invention has many possible applications where polarisation control is required. It is generally most convenient for all the birefringent elements to be linearly birefringent but the general requirement is that the elements rotate about sequentially orthogonal axes on the sphere.

Figure 10:
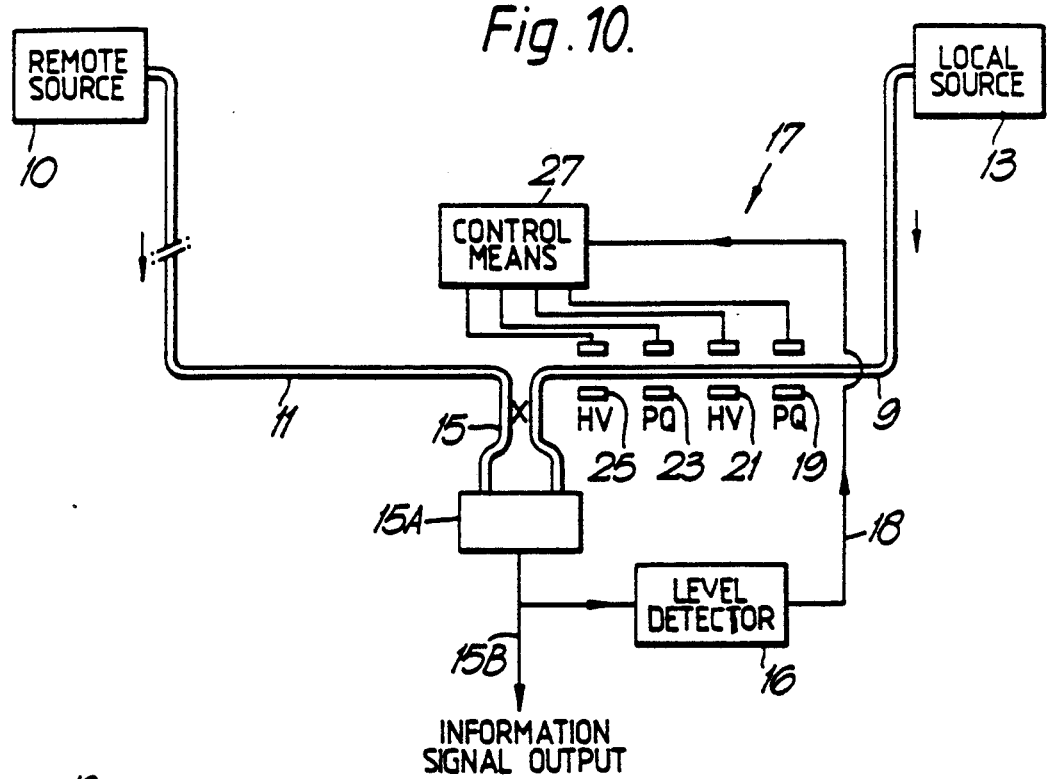
FIG. 10 is a schematic diagram of a heterodyne receiver incorporating the polarisation controller of FIG. 3.

A heterodyne detection system is one application for the present invention. Referring to FIG. 10, the system includes a remote source 10 and an input monomode optical fibre 11, along which data signals are transmitted from the source 10. A local oscillator 13 provides a signal having a slightly different carrier frequency. The two signals are combined in directional coupler 15. For maximum intensity of output signal, the incoming data signal and the local oscillator signal must be polarisation matched.

The state of polarisation (SOP) of the data signal will vary from its initial state as it propagates along the fibre, and the SOP at the receiver will vary with time. The SOP of the local oscillator signal will also be time dependent. A polarisation controller 17 is provided to match the instantaneous polarisation state of the local oscillator signal at the coupler to the instantaneous polarisation state of the incoming signal. Since the SOP of the local oscillator signal is continuously varying, the controller 17 must be capable of altering the oscillator signal to any SOP S' of the incoming data signal.

The signal from the coupler 15 is fed from receiver 15A along an output line 15B, and its level is detected by level detector 16. An output signal from the level detector 16 indicates the intensity, and thus the degree of match in the optical coupler 15, and this signal is passed along line 18 to control means 27 for controlling birefringent elements 19, 21, 23 and 25 in a manner as described with reference to FIGS. 3 to 8.

The birefringent elements 19 to 25, and the optical coupler 15, are arranged in a series combination positioned between the remote source 10, and the local source 13, of the optical signals. The particular tasks of rotation on the Poincare sphere are allocated to the birefringent elements 19 to 25 in the order described above.

Figure 11:
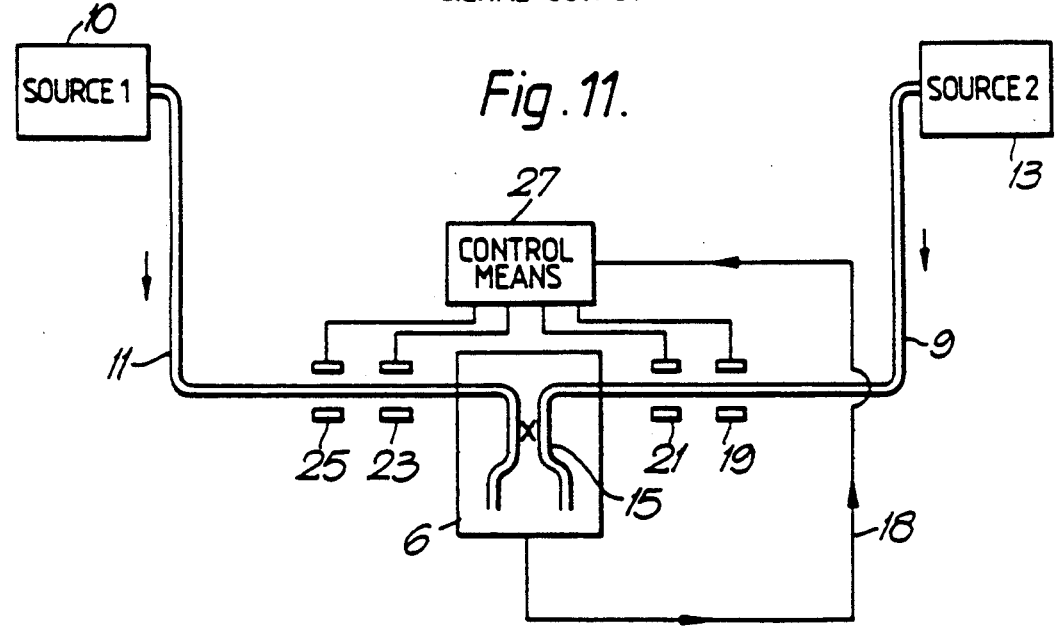
FIG. 11 is a schematic diagram of polarisation control apparatus embodying the invention for adjusting the state of polarisation of one or both of two optical signals to achieve a chosen relationship between the states of the signals, where the states of both signals may vary with time.

FIG. 11 illustrates the principle that, provided the tasks of rotation on the Poincare sphere are allocated correctly to the birefringent elements along the series combination, the optical coupling means 15 does not necessarily have to be positioned at one end of the series combination. For example as shown in FIG. 11, the optical coupling means 15 can be positioned part way along the series combination of the birefringent elements 19, 21, 23 and 25. The effect of this is that the first and second birefringent elements 19 and 21 are positioned along optical fibre 9, and the birefringent elements 23 and 25 are positioned in the path of optical fibre 11. It is of course important that the birefringent elements in the two separate arms are carefully aligned. For example where the birefringent elements are squeezers in pairs at alternating inclinations of 45°, as shown in FIG. 3, it is important that elements 19 and 23 in the two different arms 9 and 11 of the series combination, are carefully aligned such that their net rotations on the Poincare sphere as seen by the coupling means are carried out about parallel axes. Similarly the birefringent elements 21 and 25 in the two arms 9 and 11 must also be aligned carefully to give parallel rotations. Also the two pairs of parallel rotations must be at approximately $\pi/2$ to each other on the sphere.

It will be apparent that the optical coupling means 15 may be positioned at other locations along the series combination of birefringent elements, for example a single element 19 may be provided in the arm 9 with the remaining elements in the arm 11, or a single element 25 may be provided in the arm 11, with the other elements in the arm 9. Also, all four elements may be provided in the arm 11. Further, all four birefringent elements may be provided in the optical fibre 11 leading from the remote source 10, and in the locality of the remote source 10. The optical coupler 15 may still be provided at the receiver 15A, adjacent the local source 13, and the level detector 16 may also be positioned in the locality of the receiver 15A. The feed-back signal indicative of the matching in the optical coupler 15 would then be fed back along the entire length of the main optical fibre 11 along the line 18, to the control means 27 adjacent the remote source. In this case, the birefringent elements 19 to 25 make appropriate adustment to the state of polarisation of the signal from the remote source 10, to take account of change which takes place along the main optical fibre 11.

It is to be appreciated that the present invention is applicable in other situations where polarisation control is required. Polarisation control apparatus embodying the invention may adjust the state of polarisation of one or both of two optical signals from a first source and a second source, to achieve a chosen relationship between the states of the signals (which need not necessarily be polarisation matching). This is achieved by four variable birefringent elements with control means assessing the relationship between the polarisation states of the two optical signals after transformation by the birefringent elements and adjusting the states as required by varying the birefringent elements. The chosen relationship may be a match, or a mismatch, or some chosen relationship in between. Similarly, one source may be a remote source and the other a local source, or both may be sources remote from the other elements, or both may be local sources. Taking this generalised view of the components, it will be appreciated that there are three main formations of the series combination of the birefringent elements and the controller (e.g. coupler and level detector), namely the controller at one or other end of the group of birefringent elements; the controller positioned between one birefringent element, and three birefringent elements; and the controller positioned with two birefringent elements on each side.

When considering the allocation of birefringent elements between two different optical fibres, care must be taken to programme the control means accordingly. A birefringent element which rotates the state of polarisation about an angle $\epsilon$ about an axis x in one fibre, must, in the other fibre, rotate the state of polarisation by $-\epsilon$ about the same axis x, to achieve the same result.

In the embodiment described above, four birefringent elements have been arranged alternately to transform the SOP about two orthogonal axes a, b. It will generally be most convenient to select just two axes. However, it will be appreciated that three or even four different axes may be chosen, provided that for any given transformation the sequence of transformation(s) is about approximately orthogonal axes on the Poincare sphere. Thus, if the respective axes of four sequential elements are a, b, c, d, then b and d must both be orthogonal (or substantially so) to c, and b must be orthogonal to a. In other words, the axes are sequentially orthogonal.

An alternative to the array of four "squeezers", or stress inducing elements, is to provide linear birefringence by stretching polarisation-maintaining fibres. Polarisation maintaining fibre is highly birefringent between two orthogonal polarisation states, and to a good approximation, external perturbations to the fibre change only the magnitude of the birefringence, leaving the principal states unchanged. Applying a controlled perturbation, such as stretching the fibre, can be used to control the net birefringence of a length of polarisation maintaining fibre. One way of providing a suitable array of four elements for polarisation control is to locate four lengths of polarisation maintaining fibre about 10-20 m long, so that each has its axis at 45° to the axis of adjacent elements. The lengths may be connected by, for example, splicing. Each length of fibre is wrapped around a piezoelectric cylinder about 4 cm in diameter. On application of a voltage to the piezoelectric cylinders, approximately 0.001% strain may be introduced to the fibre, resulting in a 3 or $4\pi$ transformation on the Poincare sphere. This arrangement has the advantage over applying direct pressure to the fibres in that the possibly damaging stresses acting on the fibres are much smaller.

The invention may also be embodied using circular birefringent elements instead of, or in combination with, linear birefringent elements as shown in FIGS. 12(a) to (c).

In FIG. 12 there are shown elements 80 for effecting circular birefringence, that is to say rotation on the Poincare sphere about the axis LR. Each element 80 consists of a Faraday rotator in which optical fibre is wound around many turns of a single circular coil, and around that multi-turn core is wound an electrical conductor carrying current I.

FIG. 12(a) shows that two of four birefringent elements may be replaced by Faraday rotators 80, without any other additional elements. In FIG. 12(a) the Faraday rotators 80 rotate about an axis LR on the Poincare sphere, and linear birefringent elements 82 rotate about axis PQ. This meets the requirement that alternating birefringent elements along a series combination rotate on the Poincare sphere about axes at right angles to each other, in this case axes LR and PQ.

FIG. 12(b) shows how four linear birefringent elements can be replaced by circular birefringent elements 80, by the addition of fixed linear birefringent elements 82, 82'. The fixed birefringent elements 82, 82' are so arranged that the element 82 introduces $\pi/2$ birefringence in one sense (rotation about axis HV), and the element 82' introduces $\pi/2$ birefringence in the opposite sense.

The total transformation which is achieved by each set of elements 82, 80, 82', is merely a net rotation about the axis PQ. Thus the combination of the Faraday rotator 80, in association with an immediately preceding fixed birefringent element 82 and an immediately following fixed birefringent element 82', is the same as a linear birefringent element rotating about the axis PQ and the combination can be regarded as a single element. Because the final fixed linear birefringent element 82' shown in FIG. 12(b) merely introduces an arbitrary fixed rotation about the axis PQ, this can be omitted from a practical device, leaving the final arrangement as shown in FIG. 12(c). Furthermore, it is not necessary to align the axes of the fixed elements P2; they are simply required to have $\pi/2$ birefringence.

Turning now to FIG. 13, there is shown a variable birefringent element suitable for use in the polarisation controller 17 of FIG. 3, and in other embodiments described, which is provided along an electro-optic waveguide on a solid state device, the variable birefringence being effected by electrodes provided on the solid state device in the region of the waveguide. In FIG. 13 a polarisation controller is provided on X-cut lithium niobate indicated at 90. A Ti-indiffused waveguide is provided at 91 and various electrodes are provided on the surface of the lithium niobate crystal 90. A phase shifter 92 is provided by two electrodes 94 generally parallel to the waveguide 91, and a further phase shifter 95 is provided by corresponding electrodes 96. Between the two phase shifters is provided a TE-TM mode converter 97 provided by interdigitated electrodes 98 extending transverse to the direction of waveguide 91. A further TE-TM mode converter is then provided at the far end of the crystal at 99, formed by further interdigitated transverse electrodes 100.

By applying varying voltages to the electrodes in the pairs 94 and 98, 96 and 100, rotation of the SOP of the light at the output of the device can be achieved by rotation on the Poincare sphere about, respectively, the HV axis, PQ axis, HV axis, and PQ axis. Thus the electrode structure shown in FIG. 13 can be made to emulate the effect of the set of four squeezers shown in FIG. 3 in spite of the strong TE/TM birefringence of the waveguide. The appended claims are to be construed accordingly.

The embodiments described above involve polarisation matching of two optical signals, and the procedure comprises rapid variations (iterative procedures or 'dithering') to achieve good tracking. Alternatively, a polarisation controller according to the invention may be used for control of two polarisation states. For example, it may be desired to provide pre-determined polarisation variations in an optical signal. In this case, the birefringent elements may be suitably pre-calibrated, and the controller pre-programmed to make appropriate changes to the birefringences in order to achieve the desired variations without exceeding the working limits of the elements. Since the desired changes are known in advance, the iterative or dithering procedure described above is not required. Such a scheme would be useful if for example it was required to maximise speed of polarisation variations. While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

I claim:

1. Polarisation controller for maintaining a chosen relationship between two polarisation states derived from a first polarisation state and a second polarisation state, where both said first and second polarisation states may vary with time, the controller comprising:
    four variable birefringent elements,
    wherein the four birefringent elements are arranged to rotate polarisation about sequentially orthogonal axes in the Poincare sphere; and
    control means for maintaining said relationship by altering the birefringence of each of the elements as required consequent upon a variation in at least one of the first polarisation state and the second polarisation state, and including means for selectively controlling the elements in such a manner that at least each of the first and fourth elements can undergo an adjustment procedure to alter the birefringence of each such element in order to avoid exceeding a working limit for each such element, while said relationship is still maintained, and such that the magnitudes of the birefringences of all the elements are consequently constrained within working limits.

2. Polarisation controller as claimed in claim 1, wherein said control means are adapted to carry out said adjustment procedure on each of the said elements.

3. Polarisation controller as claimed in claim 2, wherein the control means are adapted to delay or interrupt, if necessary, the carrying out of said adjustment procedure on the second and third elements in the sequence until the two polarisation states are such that the required alteration of birefringence becomes possible without loss of said chosen relationship.

4. Polarisation controller as claimed in claim 1, wherein the control means are adapted such that the second and third elements in the sequence never reach their working limits and accordingly those elements never need selection for said adjustment procedure.

5. Polarisation controller as claimed in claim 1, wherein the control means are adapted such that the adjustment procedure carried out on a selected element involves simultaneously varying the magnitude of the birefringence of at least two of the remaining elements.

6. Polarisation controller as claimed in claim 5, wherein the control means are adapted such that variation of the birefringence of the selected element by any desired amount involves a change in magnitude of the angle of rotation on the Poincare sphere for each other element of not more than $\pi$.

7. Polarisation controller as claimed in claim 1, wherein the element are arranged such that said axes all lie in the same plane, and the elements thereby effect rotation about only two axes in the Poincare sphere.

8. Polarisation controller as claimed in claim 1, wherein the control means are adapted so that the adjustment procedure is capable of adjusting the birefringence of a selected element to vary its angle of rotation on the Poincare sphere by more than $\pi$ over a period where one other element is controlled to produce a rotation about the same axis as said selected element but with a larger radius of rotation on the Poincare sphere than said selected element during at least part of the period.

9. Polarisation controller for maintaining a chosen relationship between two polarisation states derived from a first polarisation state and a second polarisation state where one only of said first and second polarisation states may vary with time, comprising:
    three variable birefringent elements arranged to rotate polarisation about sequentially orthogonal axis in the Poincare sphere; and
    control means for maintaining said relationship by altering the birefringence of each of the elements as required consequent upon a variation in said one only time-varying polarisation state,
    and including means for selectively controlling the elements in such a manner that at least the element adjacent to said one only time-varying polarisation state can undergo an adjustment procedure to alter the element's birefringence in order to void exceeding a working limit for that element while said relationship is still maintained and such that the magnitudes of the birefringence of all three elements are consequently constrained within working limits.

10. Polarisation controller as claimed in claim 9, wherein the control means are adapted to carry out one adjustment procedure on each of the elements.

11. Polarisation controller as claimed in claim 1 or claim 9, wherein said control means include assessment means for identifying the chosen relationship between the two polarisation states.

12. Polarisation controller as claimed in claim 11, wherein said assessment means is arranged to identify a match or mis-match between said states, and is located between any two of said elements.

13. Polarisation controller as claimed in claim 1 or claim 9, wherein at least one of said elements comprises variable linear birefringent means.

14. Polarisation controller as claimed in claim 1 or claim 9, wherein at least one of said elements comprises variable circular birefringent means.

15. Polarisation controller as claimed in claim 14, wherein at least one element comprises variable circular birefringent means and fixed linear birefringent means.

16. Polarisation controller as claimed in claim 1 or claim 9, wherein at least one element comprises variable electro-optic birefringent means.

17. Coherent detection system comprising a polarisation controller as claimed in claim 1 or claim 9 for matching the polarisation of a data signal to that of a local oscillator signal.

18. A method of maintaining a chosen relationship between two states of polarisation derived from a first polarisation state and a second polarisation state by transformation of polarisation through four rotations about sequentially orthogonal axes in the Poincare sphere, where both said first and second polarisation states may vary with time, the method comprising:
    establishing a sequence of rotations to effect the desired net transformation; and
    altering the said rotations as required consequent upon a variation in at least one of the first polarisation state and the second polarization state; and
    selectively carrying out an adjustment procedure on at least each of the first and fourth rotations, the adjustment procedure including altering the angle of the selected rotation in order to avoid exceeding a working limit for said selected rotation; and altering the other rotations as required to maintain said relationship during the adjustment procedure;
    said adjustment procedure being executed at a substantially faster rate than the time variations of either of the time-varying first and second polarisation states; and
    controlling the adjustment procedure and the altering of rotations in such a manner that none of the four rotations exceeds a working limit.

19. A method of maintaining a chosen relationship between two states of polarisation derived from a first polarisation state and a second polarisation state by transformation of polarisation through three rotations about sequentially orthogonal axes in the Poincare sphere, where only one of said first and second polarisation states may vary with time, the method comprising:
    establishing a sequence of rotations to effect the desired net transformation; and
    altering the said rotations as required consequent upon a variation in said one only time-varying polarisation state; and
    selectively carrying out an adjustment procedure on at least the rotation adjacent to said one only time-varying polarisation state, the adjustment procedure including altering the angle of the selected rotation in order to avoid exceeding a working limit for said selected rotation, and altering the other rotations as required to maintain said relationship during the adjustment procedure,
    said adjustment procedure being executed at a substantially faster rate than the time variation of said one only time-varying polarisation state, and
    controlling the adjustment procedure and the altering of rotations in such a manner that none of the three rotations exceeds a working limit.

20. A method according to claim 18 or claim 19 wherein at least the first rotation in the said sequence is carried out on the first polarisation state and each subsequent rotation in the sequence is carried out on the second polarisation state to achieve the desired net transformation.

* * * * *